May 10, 1966 I. KAMLUKIN 3,250,064
POWER DRIVEN TRACTOR MOUNTED IMPLEMENT
Original Filed Aug. 8, 1960 5 Sheets-Sheet 5
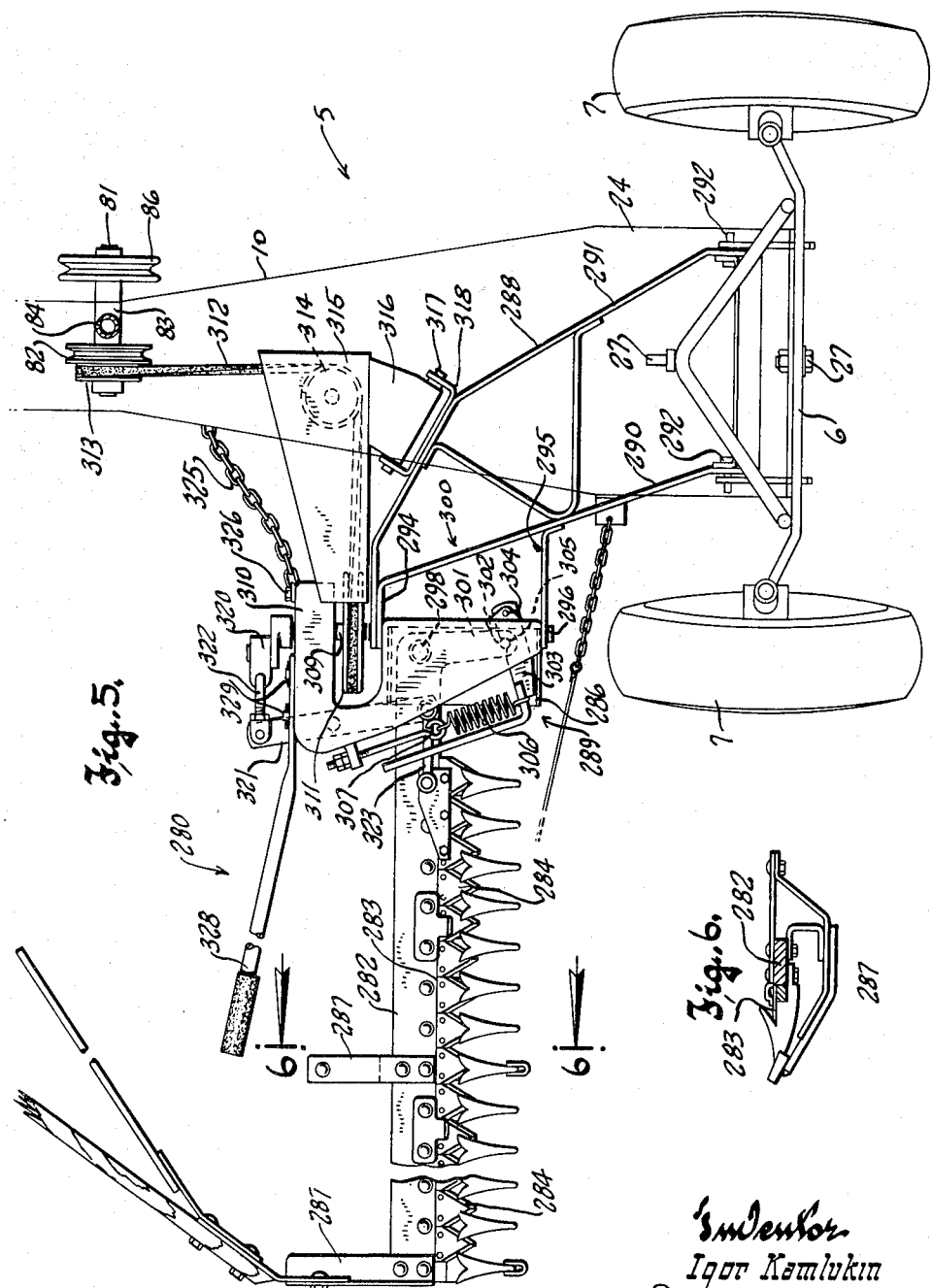

United States Patent Office 3,250,064
Patented May 10, 1966

3,250,064
POWER DRIVEN TRACTOR MOUNTED
IMPLEMENT
Igor Kamlukin, Milwaukee, Wis., assignor to Simplicity Manufacturing Company, Port Washington, Wis., a corporation of Wisconsin
Original application Aug. 8, 1960, Ser. No. 48,239, now Patent No. 3,187,821, dated June 8, 1965. Divided and this application Mar. 9, 1964, Ser. No. 350,418
1 Claim. (Cl. 56—25)

This application is a division of my copending application, Serial No. 266,258, filed March 19, 1963, now abandoned, which is in turn a division of my application Serial No. 48,239, filed August 8, 1960, now Patent 3,187,821, issued June 8, 1965.

This invention relates to power driven lawn and garden equipment, and has more particular reference to improvements in tractors of the so-called riding type and power driven implements which may be mounted thereon and driven thereby.

One of the primary purposes of the invention resides in the provision of a power unit which is adapted to be coupled with lawn and garden equipment of the type having rotatable or otherwise movable work-performing instrumentalities which must be driven from the power unit.

From this it will be seen that it is one of the main objects of the invention to provide a power unit or tractor which is especially designed to be coupled with any of a wide variety of implements to provide both propulsion for such implements and a power source by which their rotatable or otherwise movable work-performing instrumentalities are driven.

A further object of the invention resides in the provision of an improved power unit or tractor of the character described, having several power take-offs located forwardly, rearwardly and at one side of the tractor, in such positions as to enable a wide variety of implements to be readily coupled to the tractor for travel therewith and to have rotatable or otherwise movable instrumentalities thereof drivingly connected with the power take-offs in such a manner that the driving connection to any such implement will not be affected by bodily movement of the implement relative to the tractor, and can be maintained when the implement is raised from its operative position, as well as when it is in its operative position, or, at the option of the operator, can be disrupted in any position of the implement.

Still another object of the invention resides in the provision of an improved power unit or tractor of the character described, having means for connecting various implements both to the front and to the rear of the tractor, which means enables the implements to be raised out of operating position by a unique lever and link system which provides for the counterbalancing of an implement at one end of the tractor by a weight attached to the implement attaching means on the other end of the tractor.

With the above and other objects in view which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate several complete examples of the physical embodiments of the invention constructed according to the best modes so far devised for the practical application of the principles thereof, and in which:

FIGURE 5 is a plan view of the front portion of the tractor chassis, illustrating how the tractor is converted into a power operated sickle bar mower; and FIGURE 6 is a sectional detail view taken on the plane of the line 6—6 in FIGURE 5, showing one of the shoes or skids for the sickle bar of the mower.

Figure 1:
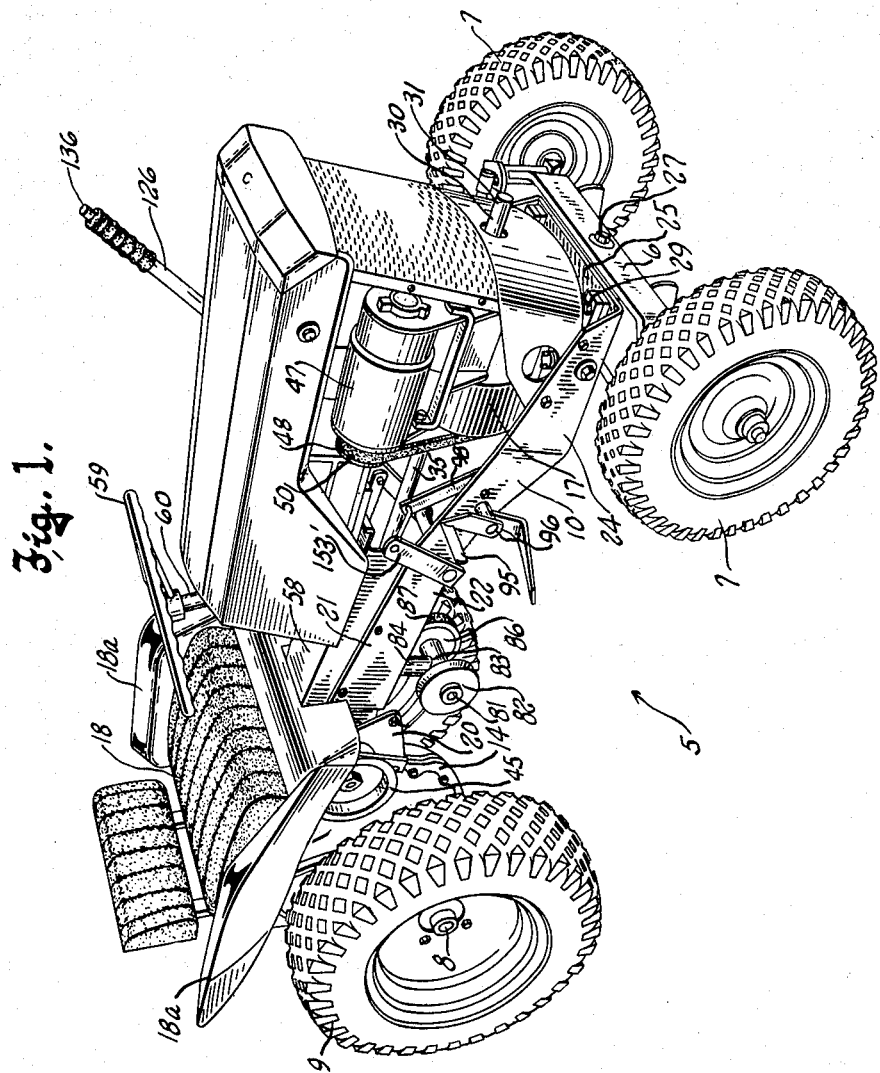
FIGURE 1 is a perspective view of the power unit or tractor of this invention, as seen from the front and one side.

Referring now more particularly to the accompanying drawings, the numeral 5 generally designates the chassis of the power unit or tractor of this invention, which is comprised of a front axle 6 having steerable wheels 7 at its ends, a rear axle 8 having larger drive wheels 9 on the opposite ends, and centrally disposed longitudinal frame means 10 connecting the medial portions of the front and rear axles to at all times maintain the same in an attitude normal to the length of the frame means and spaced apart a distance to accommodate a rotary lawn mowing device 12 between the front and rear wheels. The lawn mowing device 12 is shown, by way of example only, in FIGURE 2.

Mounted on the extreme forward end of the frame means is an internal combustion engine 17 which drives the tractor and powers the implements connected thereto. With the forward disposition of the engine described, an operator of the tractor may occupy a seat 18 mounted on the frame means 10 at the rear of the tractor, substantially directly above the rear axle 8. Fenders 18a extend outwardly and upwardly at the sides of the seat, over the rear wheels and serve as guards for belts 41 and 180 described hereinafter.

The frame means 10 comprises a channel-shaped main frame section 22 which extends from the seat 18 forwardly to the front axle 6, where it terminates a short distance above the front axle, and a transmission housing 14 mounted on the rear axle 8. The transmission housing is rigidly connected to the rear portion of the channel-shaped frame section 22 by means of a pair of opposite forwardly extending plates 20 secured to the transmission housing at their rear and affixed to the opposite upright side flanges 21 of the channel-shaped main frame section.

That portion of the frame section 22 which is located immediately ahead of the driver's seat 18 is at an elevation above both of the axles of the tractor, and substantially at the level of the tops of the smaller front wheels 7 of the tractor. About midway between the forward portion of the seat 18 and the front axle, the channel-shaped frame section 22 is bent downwardly to terminate in a downwardly offset and widened front end portion 24, the web 25 of which lies horizontally a short distance above the level of the front axle 6.

The front axle is connected to the downwardly offset front end portion 24 of the frame means by swivel joint means 27 which permit the front axle to have up-and-down rocking motion about a longitudinal axis substantially medially between the wheels 7 at its ends.

The internal combustion engine 17 is nested in the widened, downwardly offset front portion 24 of the frame means, between the flanges thereof, and rests upon and is secured to the web 25 of the channel as by means of bolts 29 passing through mounting ears on the base of the engine and through the web. The engine is so oriented as to have its crankshaft 30 disposed on an axis which extends longitudinally of the tractor and lies substantially midway between the side flanges 21 of the elevated portion of the channel-shaped frame section ahead of the driver's seat. It is important to note that the projecting portion of the engine crankshaft which would be considered its normal power take-off end 31 extends forwardly of the tractor to be accessible thereat as an implement drive power take-off, while the flywheel end 32 of the crankshaft faces rearwardly so that cooling air which is moved across the hot parts of the engine by impeller blades 33 on the flywheel is blown forwardly over the engine, away from an operator occupying the seat 18.

This forward disposition of the air-cooled internal combustion engine 17 is important for several reasons. It makes for good weight distribution, with the engine located close to and above the front axle 6 while the weight of the transmission 14 and the driver occupying the seat 18 are over the rear axle 8. It also facilitates the transmission of driving torque to the rear wheels by means which includes an elongated rearwardly extending torque shaft 35 disposed substantially coaxially with the crankshaft 30 and which connects the crankshaft with a main transverse drive shaft 38 journaled in a gear box 37 mounted on the frame means 10 beneath the driver's seat, between the plates 20 of the frame means.

Figure 3:
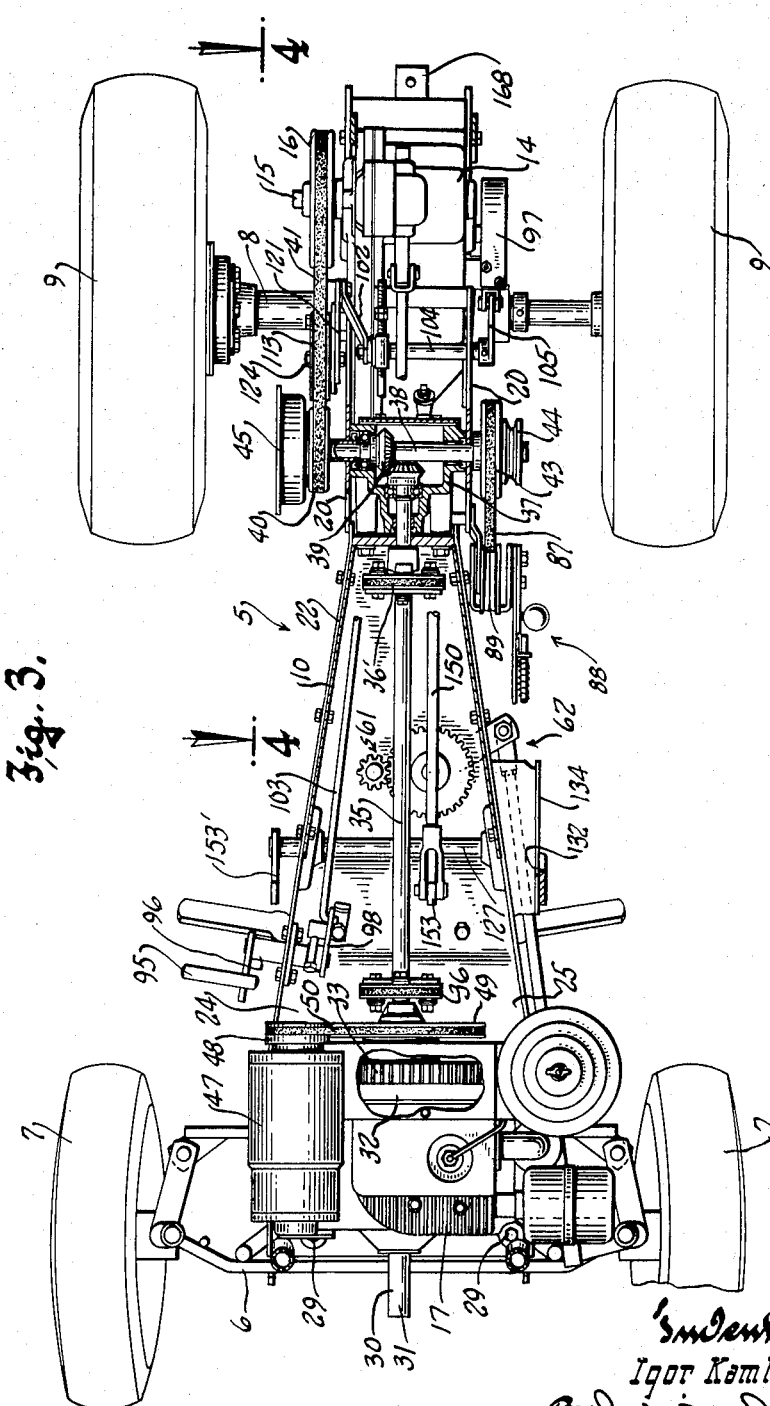
FIGURE 3 is a view, partly in plan and partly in longitudinal section, looking down upon the chassis of the tractor substantially along the line 3—3 of FIGURE 2.

The forward end of the torque shaft 35 is coaxially connected with the flywheel 32 of the engine by means of a flexible coupling 36, and a similar flexible coupling 36' intermediate the ends of the torque shaft, just ahead of the gear box, accommodates slight misalignments between the engine and the gear box. As best seen in FIGURE 3, the connection between the torque shaft and the main transverse drive shaft 38 comprises cooperating bevel gears 39 on said shafts, housed in the gear box 37.

The ends of the main transverse drive shaft 38 project to opposite sides of the frame means of the chassis, with one end of the drive shaft having a drive or output pulley 40 thereon. Journaled in the transmission housing 14 is an input shaft 15 having an input pulley 16 on one end thereof which aligns edgewise with the drive or output pulley 40 on the transverse drive shaft 38. A V-belt 41 encircling the pulleys 16 and 40 provides for drivingly connecting the torque shaft 35 with the transmission input shaft 15 so that driving torque can be transmitted from the internal combustion engine 17 to the rear wheels 9 of the tractor through the customary gearing (not shown) within the transmission housing.

The provision of the transverse drive shaft 38, at a location close to the rear axle of the tractor, is another important feature of the tractor of this invention. Its advantage resides in the fact that it is adapted to provide a power take-off from which driving torque can be transmitted to certain types of implements that may be coupled to the tractor. To this end the transverse drive shaft 38 may be provided, at its end remote from the output pulley 40, wtih a pair of power take-off pulleys 43 and 44. The transverse drive shaft 38 can also have a rope starter drum 45 secured thereto, adjacent to the output pulley 40, to facilitate starting of the internal combustion engine 17 from a location adjacent to the rear of the tractor. To provide access to the rope starter drum 45, the operator's seat 18 is supported from the chassis for upward and rearward swinging motion about a pivot 46 having a transverse axis behind the seat, out of its operative position (seen in FIGURE 2), to an elevated position (seen in FIGURE 4). It will be seen that the transverse drive shaft 38 can be used for the rope starter connection because of the fact that said shaft is at all times drivingly connected with the crankshaft of the engine.

If desired, automatic starting of the air-cooled internal combustion engine 17 can be provided for by means of a combination electric starter motor and generator 47 supported by the chassis in a position alongside the engine and having its drive pulley 48 drivingly connected, by means of a V-belt 50, with a larger pulley 49 which is connected with the flywheel end of the engine crankshaft. In order to permit the belt 50 to be trained about the pulleys 48 and 49, or to be removed therefrom whenever necessary, one or both of the flexible couplings 36 and 36' of the torque shaft 35 can be disassembled for either complete or partial removal of the torque shaft.

The transmission and rear axle construction are substantially conventional. For details of them reference may be made to my aforementioned copending application.

The transmission provides three speeds forward and one in reverse for the tractor. Its gears are shifted by by means which includes a shift lever 57 that projects upwardly through a cover 58 over the horizontal raised portion of the channel-shaped main frame section 23, so as to be easily accessible to an operator occupying the seat 18.

The tractor is also provided with steering gear, including a steering wheel 59 on the upper end of a steering column 60 which is operatively connected to the front wheels through gears 61 and linkage 62. The steering wheel 59, of course, is located ahead of the gear shift lever 57 so that it too is readily accessible to an operator occupying the seat 18.

Figure 2:
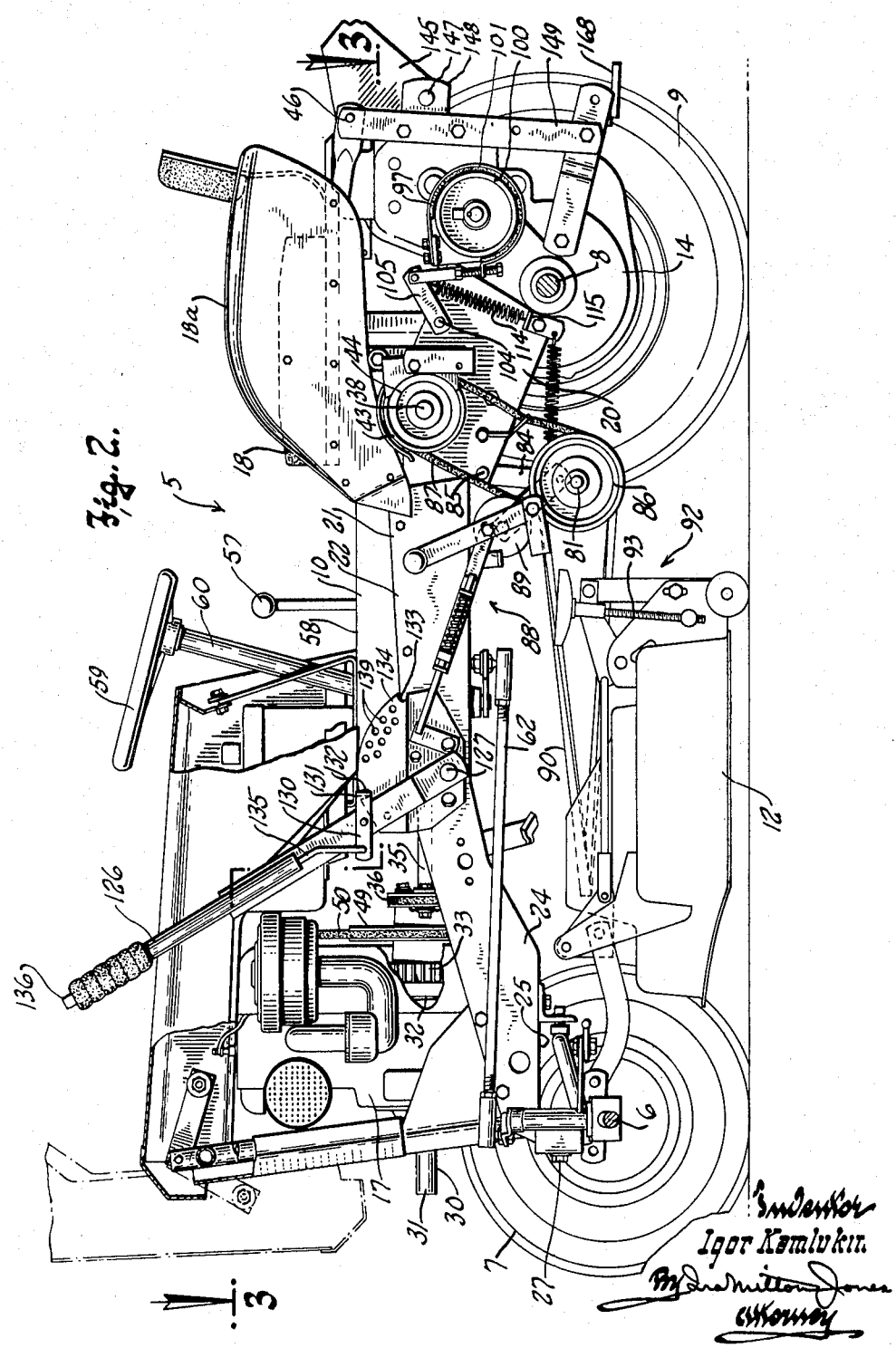
FIGURE 2 is a side elevational view on a larger scale of the power unit illustrated in FIGURE 1, with portions broken away to better illustrate the placement of the components of the power unit and other details of construction.

As indicated in FIGURE 2, the tractor is readily convertible to a power driven lawn mowing device of the riding type by the attachment of a rotary lawn mower 12 to the front axle of the tractor in the manner disclosed in Patent No. 2,924,928 issued to Igor Kamlukin and Nolan Rhoades on February 16, 1960. Similarly, the blades of the rotary lawn mower may be driven from a power take-off pulley 82 in the manner illustrated in the aforesaid patent. For this purpose a transverse bearing 83 is suspended by means of tubular hanger 84 from a crosspin 85 having its ends anchored in the plate-like frame members 20, so that the bearing 83 can swing back and forth, about an axis which is parallel to but slightly below and forwardly of the main transverse drive shaft 38. The bearing 83 freely rotatably journals a shaft 81 having the power take-off pulley 82 secured to one end thereof and an input pulley 86 secured to its opposite end, so that the pulleys rotate in unison. A belt 87 is trained around the input pulley 86 and the output pulley 43 on the main drive shaft 38 and the driving connection through the belt can be engaged or disrupted, at the will of the operator, by means of a manually operable over-center type shift mechanism 88 which comprises an idler pulley 89 that can be swung forwardly away from the belt 87, as seen in FIGURE 2, to disconnect the drive between the main transverse drive shaft 38 and the power take-off shaft 81, or can be swung rearwardly to an operative position at which it tensions the belt 87 into driving relationship with its pulleys 43 and 86. The power take-off pulley 82 on the power take-off shaft 81 is connectible by means of a quarter-twist belt 90 with the pulley (not shown) of the rotary lawn mower, so as to transmit rotation to the blades of the mower whenever the manually operable shift mechanism 88 is in an operative position.

The rotary lawn mower 12 is, in most respects, similar to that disclosed in the aforesaid Patent No. 2,294,928, except that it is provided with a lever and link system 92, controlled by a handscrew 93, by which the mower body can be translatingly adjusted either up or down, both during operation of the mover unit and when it is at rest, to provide for adjustment of cutting height.

A foot pedal 95 mounted on a stub shaft 96 in a flange at the front portion of the main frame member provides an actuating lever for controlling engagement and disengagement of the drive from the transverse drive shaft 15 of the transmission. Also, when the foot pedal 95 is swung forwardly about the axis of the shaft 96 beyond the point where it effects disengagement of the transmission drive, it effects application of a brake 97, located at the side of the chassis remote from the input pulley of the transmission, and by which the rear wheels may be held against motion. The shaft 96 is keyed to the foot pedal and to an arm 98 which projects upwardly and slightly rearwardly from the shaft and which is biased to swing downwardly and rearwardly by means of a tension spring 99 connected between the upper end of the arm and an anchor on the web of the main frame member.

The brake comprises a brake drum 100 fixed to one of the shafts of the transmission 14 and a brake band 101 which can be tightened around the drum by means of a linkage connected with the foot pedal actuated arm 98 and which includes a lever 102 near the rear of the tractor and connected with the arm 98 by an elongated link rod 103, a shaft 104 to which the lever 102 is swingably secured, and a second lever 105 fixed to the shaft 104 and connected with the brake band. For further details of the brake structure reference may be made to my aforementioned copending application.

The initial motion of the brake pedal 95, which is permitted to occur before tightening of the brake band about its drum commences, is relied upon to effect disengagement of the driving connection between the output pulley 40 on the main transverse drive shaft 38 and the input pulley 16 on the transmission. This is accomplished by means of an idler or belt-tightening pulley 113 which is mounted for up-down motion, to and from a belt-tightening position (illustrated in FIGURE 4 ) in which it is normally held engaged under upward bias with the lower stretch of the belt 41. The belt-tightening pulley 113 is freely rotatably journaled on a bolt 124 or the like which is mounted in the elbow of a bell crank lever 121. The extremity of the lower arm 122 of the bell crank lever is carried on a pivot 123 which is secured in and projects from the side of the transmission housing 14, to mount the bell crank lever for swinging motion by which the belt-tightening pulley 113 is carried up and down. The upper arm 125 of the bell crank lever is connected with a swivel bolt 106 in the upper end of the lever 102 by means of a link 118, the upper end of which is pivoted on the swivel bolt and the lower end of which is connected with the extremity of the upper arm 125 of the bell crank lever by a pivot 120.

A substantially strong tension spring 114 has its lower end connected to the frame means, as at 115, and its upper end connected to the outer end of the lever 105 on the cross shaft 104. Bearing in mind that the levers 102 and 105 are both connected to the cross shaft 104 so that they are constrained to swing in unison about the axis of said shaft, it will be seen that the spring 114 tends to hold the brake released, and, through lever 102 and link 118, maintains a force upon the bell crank lever 121 that tends to hold the belt-tightener pulley 113 in its upward position in which it maintains the belt 41 in driving engagement with its pulleys 40 and 16.

Figure 4:
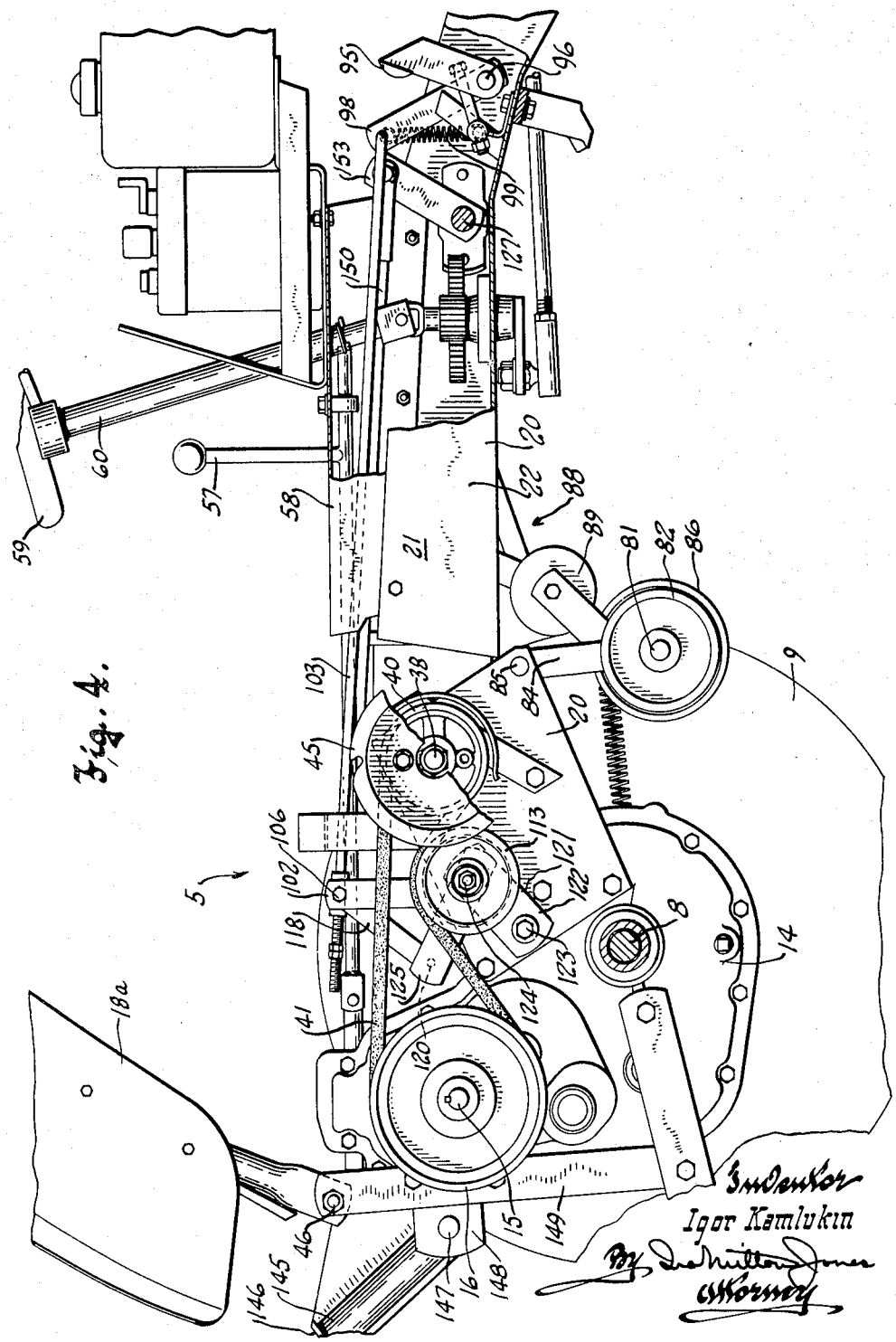
FIGURE 4 is an enlarged detail view of the rear portion of the tractor, taken substantially along the plane of the line 4—4 in FIGURE 3.

With this arrangement, it will be seen that the elongated link 103 can be drawn endwise forwardly by the combined clutch and brake pedal 95 to cause the lever 102 to swing clockwise (as viewed in FIGURE 4) about the axis of its cross shaft 104, to also cause the bell crank lever 121 to rock in a clockwise direction about its pivot 123, thereby imparting downward belt loosening motion to the idler pulley 113 carried thereby. When the combined brake and clutch pedal is released by the operator, the spring 99 returns the pedal and the elongated link 103 to their rearmost positions, shown in FIGURE 4, and the tension spring 114 reacts through the lever and link system 117 to return the belt tightener pulley 113 to its operative position as shown in FIGURE 4.

At its side opposite the foot pedal 95, the tractor is provided with an elongated upwardly extending implement lift lever 126, the lower end of which is pivotally connected with the channel-shaped medial portion of the main frame means, as at 127, to provide for fore and aft swinging movement of the lift lever by which an implement connected with either the front or the rear of the tractor can be raised or lowered. In the present case, when the lever is moved toward its foremost position (shown in FIGURE 2), it moves an implement connected with the front of the tractor to a lowered or operative position or raises an implement connected to the rear of the tractor to an inoperative position. Similarly when the implement lift lever is swung to a rearmost position from that shown in FIGURE 2, it is adapted to hold an implement at the front of the tractor at an elevated inoperative position or to lower an implement connected with the rear of the tractor to its operative position.

The implement lift lever 126 is adapted to be releasably held in either of its extreme positions of motion by means of a medially pivoted latch 130 carried by the lever. At one end the latch 130 has a dog 131 that is selectively engageable in either a forward notch 132 or a rearward notch 133 in a sector-like plate 134 fixed to the side of the main frame member. The other end of the latch 130 is connected, by means of a rod 135, with a push button release 136 mounted in the grip portion at the top of the implement lift lever 126. When the push button 136 is depressed, the latch dog 131 is swung upwardly to disengage it from either of the notches 132 or 133 in the sector plate 134, freeing the implement lift lever for swinging motion either forwardly or rearwardly.

FIGURE 5 illustrates the manner in which the power unit or tractor of this invention can be converted to a power driven mowing device by the attachment to the tractor of a sickle bar mower generally designated 280. The sickle bar therein shown comprises an elongated cutting bar which includes a guide 282 and a blade 283 having a series of forwardly converging tooth-like cutters 284 thereon. The blade, of course, is mounted on a guide for reciprocatory motion along the length of the latter, in directions normal to the longitudinal axis of the tractor. In generally conventional fashion, the cutting bar of the mower is supported by a number of shoes, there being a wide and more or less flat shoe 286 at the inner end of the bar and two or more narrower shoes 287 outwardly of the shoe 286, one of which is located at the extreme outer end of the bar.

The cutting bar of the mower is coupled to the tractor, to travel therewith, by frame means which comprises an inboard frame section 288 and an outboard frame section 289, the outboard frame section being hingedly connected to the inboard frame section in a manner to be described shortly. The inboard frame section 288 comprises a framework fabricated of metal bars and which includes opposite side bars 290 and 291 that have their forward extremities pivotally connected, as at 292, with the front axle of the tractor by means of transversely extending pivot pin connections. Since these pins are located beneath the downwardly offset forward end portion of the channel-shaped main frame member, the two arms 290 and 291 are likewise disposed beneath the main frame of the tractor and extend rearwardly therebeneath, but they are also inclined outwardly toward the right side of the tractor, from which the arm of the sickle bar mower projects. The rear end portions of the two arms 290 and 291 are bent laterally outwardly, so that they extend substantially parallel to the axes of the tractor wheel axles, and they are contiguous to one another to provide, in effect, a single laterally projecting arm 294. Another arm 295, which is parallel to but forwardly of the arm 294, and is rigidly secured to the outer frame arm 290 a short distance behind the front right wheel, co-operates with the arm 294 to provide for the support of a longitudinally extending hinge pin 296, the axis of which is substantially in line with the right front wheel.

The outboard frame section 289, which may be in the form of a casting, is hingedly supported on the hinge pin 296 for up-and-down swinging motion, and it, in turn, has a vertical pivot pin 298 affixed therein and depending therefrom on which the inner end of the cutting bar is mounted for horizontal swinging motion between an operative position, shown in FIGURE 5, and a rearwardly retracted position toward which the cutting bar can travel in the event it encounters an obstruction, such as a rock, a boulder or even a tree. The cutting bar is normally held in its operative position, extending transversely out from the righthand side of the tractor, by means of a latching device, generally designated 300, which comprises a forwardly projecting arm 301 on the inner or pivoted end of the cutting bar having a vertical pin 302 fixed in its front extremity. A keeper 303 which cooperates with the latch arm 301 is pivoted, as at 304, on a portion of the outboard frame section to swing about a vertical axis toward and from a locking position at which the pin 302 in the outer end of the latch arm is engaged in a notch 305 in the adjacent side edge of the keeper. The keeper 303 is normally held in its locking position by means of a strong tension spring 306 which is connected at one end to the keeper and at its other end to an adjustable eye 307 fastened to a portion of the outboard frame section. The spring 306 allows the keeper to swing forwardly and permit the pin 302 to be cammed out of the notch 305 in the event the cutting bar encounters an obstruction which might damage the mower, and the cutting bar can then swing rearwardly to a position at which it clears the obstruction.

From the description thus far it will be apparent that the pivoted connection 292 of the inboard frame section 288 with the front axle of the tractor allows the inboard section to swing up and down relative to the tractor chassis about a transverse axis parallel to and slightly behind the front axle but beneath the main frame member of the chassis. As the inboard frame section swings up and down, the upright hinge pin 296 on its laterally projecting rear end portion if of course carried up and down with it. Provision for such up-and-down motion of the cutting bar 282 is important because the cutting bar may be considered to be self-supporting by reason of the engagement of its shoes with the surface being mowed, and whenever the shoes travel over irregular ground they cause the arm to move up and down in a manner which is translated into up-and-down swinging motion of the inboard frame section 288 about its pivots 292.

It will also be noted that the hinge connection between the inboard and outboard frame sections allows the cutting arm to swing up and down about the axis of the hinge pin 296 as the arm encounters uneven ground during mowing, without in any wise disturbing the position of the inboard frame section 288.

The outboard frame section 289 also carries an input shaft 309 which is journaled in a rearward portion 310 of the outboard frame section for rotation on an axis coincident with that of the hinge pin 296. An input pulley 311 is mounted on the input shaft 309, directly behind the rear extremity of the hinge pin 296, and a V-belt 312 is trained around said input pulley and an output pulley 313 on the same power take-off shaft 81 that is provided for driving a rotary lawn mower such as is mentioned hereinbefore. The intermediate portions of the belt 312 are trained about idler means 314 comprising an upper and a lower idler pulley, one for each stretch of the belt 312. The idler pulleys are freely rotatably carried in a belt guard housing 315 for rotation on a generally upright axis which disposes the idler pulleys in a position such that the belt stretches extend straight forwardly from the output pulley 313 and straight sidewardly to the input pulley 311. The belt guard housing 315 extends around all sides of the belt adjacent to the idler pulleys, but is open at its rear, and it has an arm 316 thereon which projects more or less forwardly from the housing, adjacent to the idler pulleys, to receive a hinge pin 317 which is carried by a rearwardly projecting U-shaped bracket 318 fixed to a rear portion of the inner arm 291 of the inboard frame section 288. The axis of the hinge pin 317 is generally horizontal, and it accommodates a slight degree of movement of the belt guard housing 315 such as might take place whenever the frame sections supporting the cutting bar move up and down in unison at their hinge connection 296, in which event the input pulley 311 of the mower will likewise move up and down and will transmit similar up-and-down motion to the belt guard by reason of the tension of the stretches of the belt on the idler pulleys carried by the housing.

By reason of the above described location of the idler means 314 the effectiveness of the belt drive to the input pulley 311 is maintained at all times, despite hinging motion of the outboard frame section such as takes place during raising and lowering of the sickle bar between its operative and transit positions, or as results from the bar riding over uneven terrain.

When rotation is transmitted to the input shaft 309 from the power take-off shaft 81 of the tractor in the manner described, an eccentric 320 fixed to the rear of the input shaft 309 transmits reciprocatory movement to the cutting blade 283 through a medially pivoted lever 321 which is carried by the outboard section of the frame. A link 322 connects the eccentric with the rear end of the lever 321, and another link 323 connects the forward end of the lever with the cutting blade. Consequently, whenever the input belt 87 for the power take-off shaft 81 is tightened into driving relationship with the pulley 86, the cutting blade 283 of the mower is rapidly reciprocated to perform its cutting function in a conventional fashion.

Inasmuch as there might be times when the inner shoe 286 encounters a depression which might allow the inboard frame section 288 to swing downwardly and carry the input pulley 311 toward and into the ground, such an occurrence is guarded against by the expedient of connecting a chain 325 between one side of the channel-shaped main frame member and the outboard frame section as at 326. The chain should of course be of such length that it will at all times prevent the hinged-together inboard and outboard frame sections from swinging bodily downwardly to where the input pulley 311 is below a safe elevation above the ground over which the tractor is traveling.

The hinge 296 about which the outboard frame section can swing also enables the cutting bar of the mower to be tilted up to a vertical or past-vertical transit position, and for this purpose an elongated handle 328 is affixed to the outboard frame section, as at 329, with the handle projecting upwardly and outwardly therefrom but located where it will be within easy grasp of an operator occupying the seat of the tractor.

It will be observed that the sickle bar mower is very simply removed from the tractor by disconnecting the two hinge pins at their connection 292 with the front axle and by detaching the chain 325 at its connection 326 with the outboard frame section 289. The belt 312, of course, is also easily removable from the output pulley 313 on the power take-off shaft 81.

From the foregoing description, taken together with the accompanying drawings, it will be readily apparent to those skilled in the art that this invention fulfills a long felt need in that it provides a power operated implement which is ideally suited for gardening, small scale farming and other tasks, and which comprises any of a number of attachments having rotatable or otherwies movable work-performing elements, and an improved power unit or tractor to which the attachments may be readily coupled, and which tractor features power take-off means at several locations thereon, from selected ones of which the rotatable or otherwise movable work-performing elements of the various attachments may be driven in a manner permitting bodily movement of the attachments relative to the tractor without disruption of the driving connection to their work-performing elements.

What is claimed as my invention is:

In combination: a tractor having a chassis including front and rear axles with wheels at their ends, a frame structure extending longitudinally between and connecting said axles, the front axle being pivotally connected with the frame structure for rocking motion relative thereto about an axis which extends longitudinally of the tractor, an internal combustion engine, transmission means at the rear of the tractor for transmitting driving torque from the engine to the rear wheels, and an engine driven power take-off pulley mounted for rotation on a transverse axis located beneath the frame structure and forwardly adjacent to the rear axle: an implement tractively coupled to the chassis and driven from said power take-off pulley, said implement having an elongated arm which extends outwardly away from one side of the tractor frame structure from a location rearwardly adjacent to one front wheel of the tractor, and a tool carried by said arm for movement relative thereto; frame means connecting said arm with the tractor chassis to constrain the implement to travel with the tractor, said frame means comprising an inboard frame section beneath the tractor frame structure, having a forward portion pivotally connected with the front axle to swing up and down relative to the tractor about a transverse axis adjacent to the front axle and to tilt from side to side relative to the tractor in consequence of rocking motion of the front axle about its connection with the tractor frame structure, said inboard frame section having a rear portion which projects laterally beyond the tractor frame structure to a position behind said one front wheel of the tractor, and an outboard frame section hingedly connected with said laterally projecting rear portion of the inboard frame section to swing up and down about a longitudinal axis spaced from the adjacent side of the tractor frame, said arm having its inner end attached to said outboard frame section whereby the arm may move up and down bodily relative to the tractor about said hinge connection and may swing up and down with the inboard frame section, relative to the tractor, about said pivotal connection between the inboard frame section and the front axle; and means for imparting motion to said tool comprising a driven pulley carried by one of said frame sections for rotation about an axis coincident with that of the hinge connection between the frame sections, idler pulley means carried by the implement frame means beneath the tractor frame structure, for rotation on an upright axis forwardly of the power take-off pulley on the tractor, and a belt trained about said power take-off pulley, the idler pulley means, and said driven pulley.

References Cited by the Examiner

UNITED STATES PATENTS

| | | | |
|---|---|---|---|
| 2,696,704 | 12/1954 | Bjork | 56—25 |
| 2,924,928 | 2/1960 | Rhoades et al. | 56—25.4 |
| 2,972,850 | 2/1961 | Ariens et al. | 56—25.4 |

ABRAHAM G. STONE, *Primary Examiner.*

ANTONIO F. GUIDA, *Examiner.*